United States Patent [19]

Kromer, III

[11] 4,455,665

[45] Jun. 19, 1984

[54] DATA MODEM CLOCK EXTRACTION CIRCUIT

[75] Inventor: Philip F. Kromer, III, Miami, Fla.

[73] Assignee: Racal Data Communications Inc., Miami, Fla.

[21] Appl. No.: 304,044

[22] Filed: Sep. 21, 1981

[51] Int. Cl.³ .................. H04L 25/03; H04L 7/06
[52] U.S. Cl. .................. 375/110; 375/14; 375/96; 364/724
[58] Field of Search .................. 375/15, 7, 43, 60, 94, 375/99, 120, 110, 106, 93, 12, 14, 96; 364/813, 724; 328/144; 333/18

[56] References Cited

U.S. PATENT DOCUMENTS

| | | | |
|---|---|---|---|
| 3,020,479 | 2/1962 | Logan | 375/113 |
| 3,393,308 | 7/1968 | Cope | 364/852 |
| 3,524,023 | 8/1970 | Whang | 375/53 |
| 3,921,075 | 11/1975 | Denny | 375/91 |
| 4,190,896 | 2/1980 | Knowlton | 328/144 |
| 4,203,070 | 5/1980 | Bowles et al. | 375/94 |
| 4,344,176 | 8/1982 | Qureshi | 375/15 |

OTHER PUBLICATIONS

D. L. Lyon "Envelope-Derived Timing Recovery in QAM and SQAM Systems" IEEE Transactions on Communication, Nov., 1975, pp. 1327-1331.

Primary Examiner—Robert L. Griffin
Assistant Examiner—Stephen Chin
Attorney, Agent, or Firm—Jackson, Jones & Price

[57] ABSTRACT

A digital timing recovery circuit operative upon digital samples of the input signal to a data receiver provided at the sample rate to produce a clock correction signal at the symbol rate utilizing a digital periodic filter providing a double restrictive bandpass characteristic about the band edge frequencies and outputting to a nonlinear device followed by a digital sampling filter designed to require only addition and subtraction of the nonlinear device outputs.

13 Claims, 5 Drawing Figures

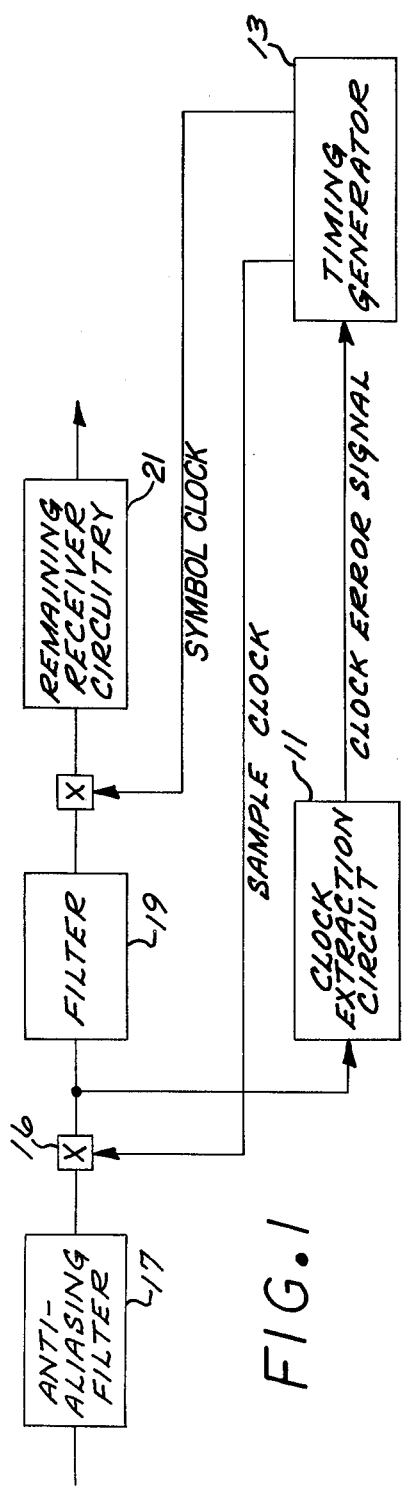
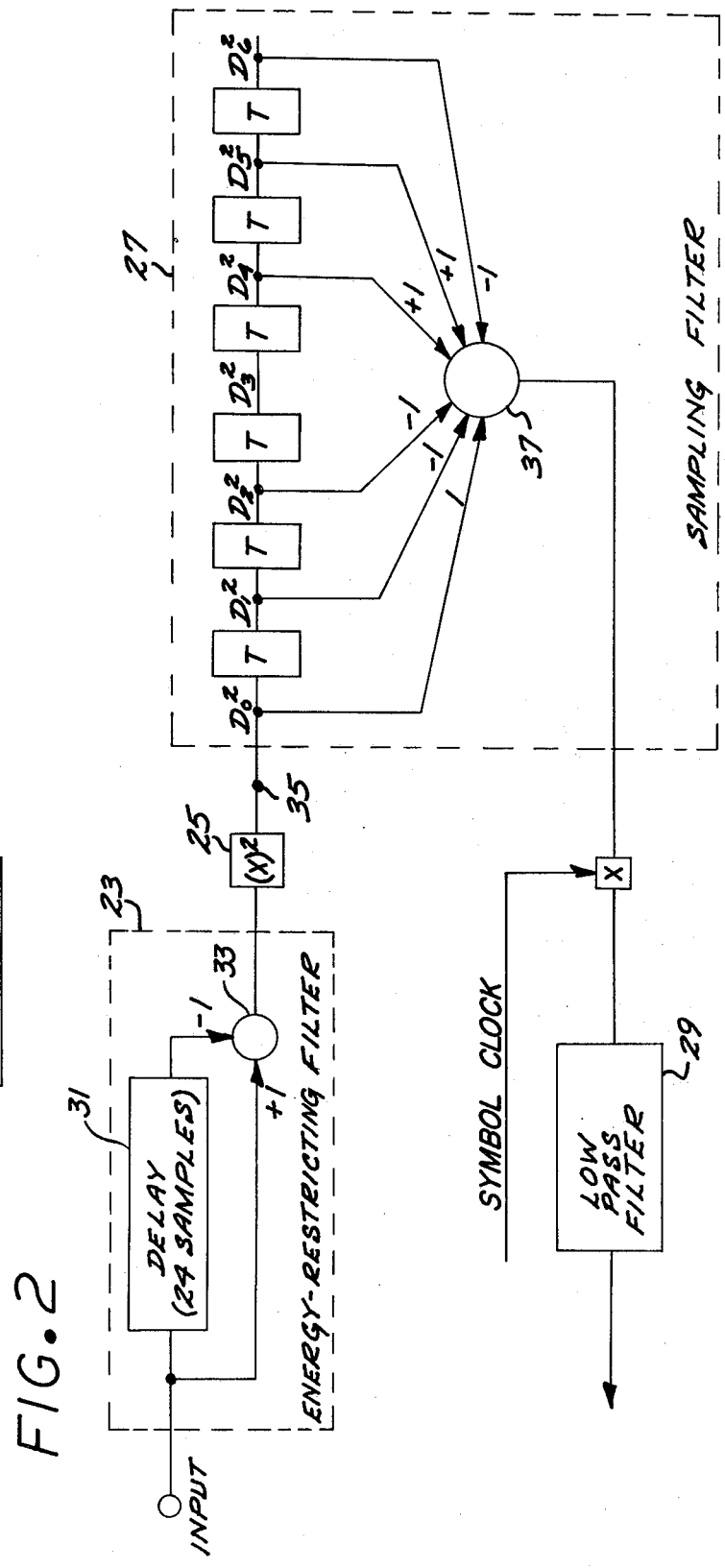
FIG.1
FIG.2

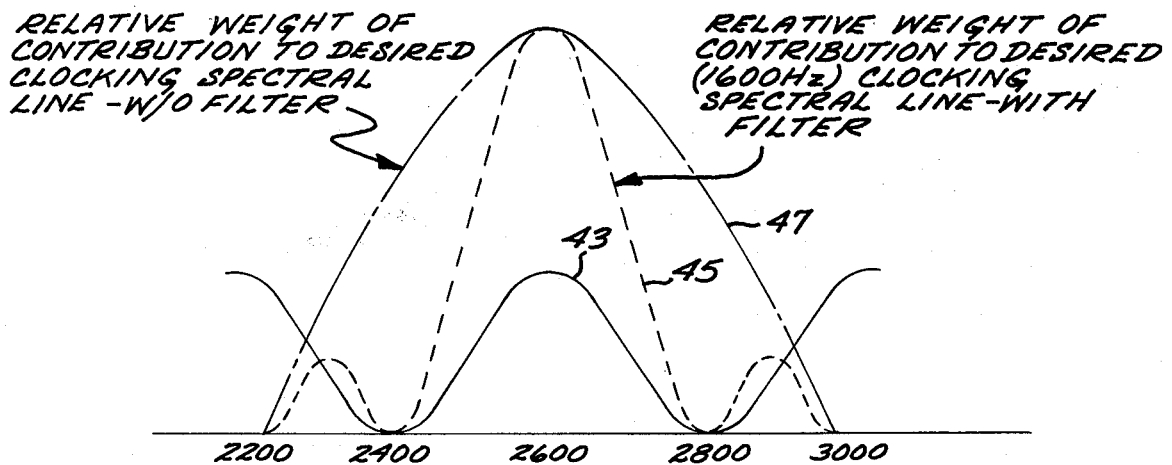
FIG. 3
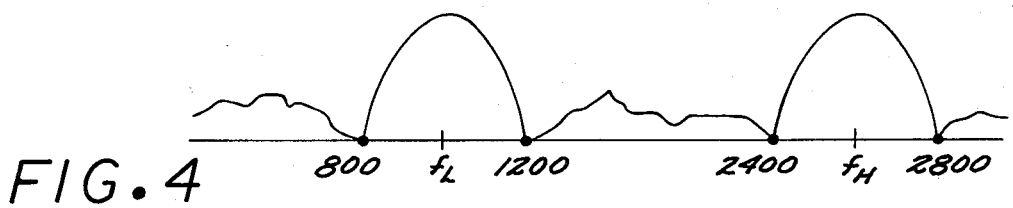
FIG. 4
FIG. 5
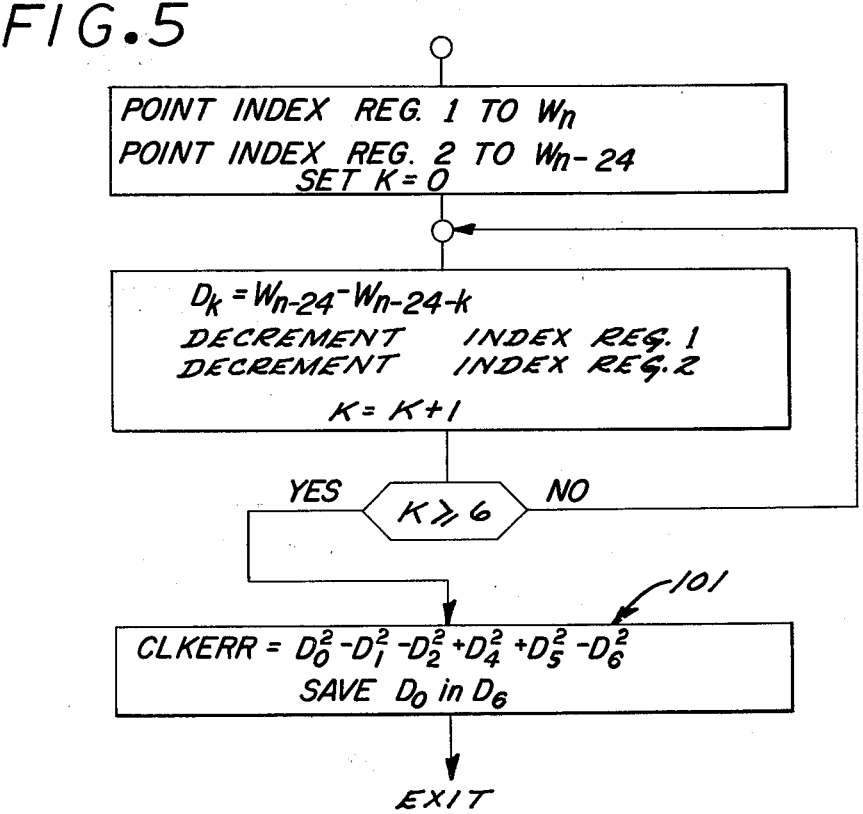

DATA MODEM CLOCK EXTRACTION CIRCUIT

BACKGROUND OF THE INVENTION

The subject invention relates to symbol data modems and more particularly to timing recovery circuits used in the receiver of such modems. The invention is particularly concerned with timing recovery circuits of the so-called envelope variety.

Derivation of timing at a data modem receiver is, of course, a critical function, and development of a signal with particular accuracy as far as synchronism with the transmitter symbol timing is highly desirable. Moreover, in today's microprocessor based modems, it is highly desirable to implement a timing recovery scheme which minimizes the number of microprocessor operations required.

SUMMARY OF THE INVENTION

It is therefore an object of the invention to provide an improved timing recovery scheme for a data samples at the sample rate and produces successive outputs. The successive outputs are then operated on to produce an output signal containing a spectral component at the symbol rate. This output signal may then be supplied to a sampling filter whose output provides an error signal suitable for adjustment of a phase locked timing generator.

An aspect of the invention believed novel is the provision of a filter, preferably a periodic filter, providing a double restrictive bandpass characteristic with peaks at $F_c \pm F_o$ where $F_c$ is the carrier frequency and $F_o$ is one-half the symbol rate.

While the foregoing summarizes inventive aspects of the invention, it is not intended to be limiting. The appended claims, properly construed, should be referred to for delineation of the actual invention.

It is yet another object of the invention to provide a clock extraction circuit adapted to a digital implementation which provides accurate timing with a reduced number of microprocessor operations.

These and other objects are accomplished according to the invention by provision of a clock extraction circuit employing a filter at the input of a data modem receiver which has a periodic characteristic in the frequency domain. The periodic filter receives samples at the sample rate and provides successive inputs to a nonlinear device at the symbol rate means. The nonlinear device supplies successive outputs to a sampling filter whose output provides an error signal. This signal is used to provide an input a phase locked timing generator which generates sample and symbol rate clocks.

BRIEF DESCRIPTION OF THE DRAWINGS

The preferred embodiment of the just summarized invention will now be described in detail in conjunction with the drawings of which:

FIG. 1 is a block diagram of a timing recovery scheme according to the preferred embodiment.

FIG. 2 is a schematic diagram of the clock extractor circuit of FIG. 1.

FIG. 3 is an amplitude vs frequency characteristic useful in illustrating the preferred embodiment.

FIG. 4 shows a generalized filter characteristic suitable for use with the preferred embodiment.

FIG. 5 is a flowchart illustrating microprocessor implementation of the preferred embodiment.

DETAILED DESCRIPTION OF THE PREFERRED EMBODIMENT

The timing recovery scheme of the preferred embodiment is illustrated in FIG. 1. The circuit includes a clock extraction circuit 11 and a timing generator 13.

The preferred relationship of these elements 11,13 in a modem receiver is indicated by FIG. 1. The clock extraction circuit receives the input signal to the data modem after an analog to digital converter 16 which samples the input signal 15. The sampling gate 16 may be preceded by an antialiasing filter 17 and automatic gain control circuitry not shown. The output of the sampler 16 feeds a filter 19, which is a digital type. The output of the filter 19 supplies an input to other detection apparatus 21, which may contain an adaptive equalizer means. As shown, the timing generator 13 provides a clock at the sample rate to the converter 16 and a clock at the symbol rate used for clocking outputs of the filters 19 and elsewhere in timing operation of the receiver. The sample clock rate is typically faster than the symbol clock, for example 9600 Hz and 1600 Hz respectively. In this example, therefore, a delay of one symbol equals a delay of six samples.

FIG. 2 illustrates in detail the clock extraction circuit 11 of FIG. 1. This circuit 11 includes an energy restricting filter 23, a squaring circuit 25, a sampling filter 27 and a low pass filter 29. The energy restriction filter 23 is of a type known as a periodic filter. It is shown as including a twenty-four sample delay element 31 and a summer 33. This filter structure is particularly suited for a 1600 baud, 1800 Hz carrier, 50% raised cosine system. In operation, a sample delayed twenty-four sample times by delay element 31 is subtracted from the current sample. The output of the summer 33 resulting from this subtraction is squared by the squarer 25 and fed to the input 35 of the sampling filter 27. It is noted that the delay through the clock extractor circuit 11 must equal the delay through the filter 19 to within an integer number of symbols.

The sampling filter 27 is shown as including a plurality of delay elements each providing a delay of T seconds where T is the sample interval. Certain of the delayed squared samples $D_0^2$, $D_1^2$, $D_2^2$, $D_4^2$, $D_5^2$ and $D_6^2$ are summed with polarities 1, −1, −1, +1, +1, and −1 by a summer 37. Such a sum is computed each symbol. The output of the summer 37, sampled at the symbol rate, is low passed filtered by the filter 27. The output of the sampling filter 27 is an error signal which can be used to adjust a phase lock loop controlling generation of the sample and symbol clocks. The phase lock loop may provide the low pass filter effect illustrated as filter 29.

FIG. 3 illustrates the nature of operation of the periodic filter 23. This illustration is particularly shown for a 1600 Hz clock derivation, for example for a 4800 b.p.s. modem with a carrier centered at 1800 Hz and a so-called '50% raised cosine rolloff'. The circuitry of FIG. 2 is also particularly adapted for use in such a modem.

It is known that in such a modem, the clock spectral line is given by $$CLK(w_o) = \int_{-\infty}^{\infty} X(w) X^*(w - w_o) dw$$

where $X(w)$ is the Fourier Transform (Spectrum) of the input to the squaring circuit. In the above equation, the asterisk indicates complex conjugation and $\omega_o = (2\pi)$ (clock frequency).

If we neglect the effects of amplitude distortion in the transmission medium, the 50% raised cosine rolloff spectrum X(2 pi f) at the receiver input will be:

$$|X(2\pi f)| = \begin{cases} 0 & f < 600 \\ \cos\left(\pi \frac{f - 1400}{1600}\right) & 1400 > f \geq 600 \\ 1 & 2200 \geq f \geq 1400 \\ \cos\left(\pi \frac{2200 - f}{1600}\right) & 3000 \geq f \geq 2200 \\ 0 & f \geq 3000 \end{cases}$$

As known to those skilled in the art, the regions about 2600 Hz ($f_H$) and 1000 Hz ($f_L$) contribute clock energy independent of the data pattern. It is also known that phase distortion can be deleterious at frequencies 200 Hz or so away from $f_H$ and $f_L$. Finally, it is also known that it is desirable to restrict energy at half the clock frequency prior to squaring. The periodic filter of the preferred embodiment has the desirable advantage of providing transmission nulls at 200 Hz on either side of both $f_H$ and $f_L$ as shown in FIG. 3 and of providing a null at 800 Hz. (half the clock frequency). While a periodic filter is used in the preferred embodiment, any filter providing a characteristic like the periodic filter about $f_H$ and $f_L$ could be utilized. Thus, a shape such as that shown in FIG. 4 would suffice. A filter providing a characteristic like that of FIG. 4 is referred to herein as a "double restrictive bandpass filter."

Curve 47 in FIG. 3 shows the result of computing the point-by-point product of X(2πf) and X(2πf−wo). The amplitude of the resulting product is given by $$A(f) = \cos(2\pi(f - 2600)/1600)$$

in the region 2200 > f > 3000Hz, after normalizing the maximum amplitude to unity.

Curve 43 in FIG. 3 shows the product of the amplitude response of the filter 23 with itself displaced by the clocking frequency. Since in this illustration the clocking frequency is a multiple of the frequency of the filter 23, the result is $$\sin^2\left(\frac{2\pi f}{400}\right)$$

(after normalizing the maximum amplitude to unity).

Curve 45 in FIG. 3 shows the effect of the filter 23 on the contribution to the clocking energy. The result of passing x(t) thru the filter 23 prior to squaring results in an alternative point-by-point product A'(f).

$$A'(f) = \sin^2\left(\frac{2\pi f}{400}\right) \cos\left(2\pi \frac{(f - 2600)}{1600}\right)$$

FIG. 5 illustrates a flow chart for implementing the clock extraction circuit in a microprocessor. The microprocessor functions discussed in the following are well-known to those skilled in the art and will not be described in further detail herein.

The flow of FIG. 5 is performed once per symbol. A store denoted "W" stores the 32 most recent samples outputted by the sampler 16 at a rate of, for example, 9600 samples per second. $W_n$ is the most recent sample received. Hence, a first index $IR_1$ is set to point to $W_n$, while a second index $IR_2$ is set to point to $W_{n-24}$. A counter K is set equal to zero. Then a loop is entered where $D_k = W_n - W_{n-24}$ is calculated and stored. After calculation of one $D_k$ value, the $IR_1$ and $IR_2$ indexes are each decremented by 1 such that the correct W values will be retrieved from the sample storage during the next iteration of the loop. The counter $K = K + 1$ is incremented to keep track of the current iteration. Next a test is performed to ascertain whether 6 $D_k$'s have been calculated and stored in positions denoted $D_0$, $D_1$, $D_2$, $D_3$, $D_4$, $D_5$. If not, the next $D_k$ is calculated, for example $D_1 = W_{n-1} - W_{n-25}$. After 6 $D_k$'s are calculated and stored, the clock error equation shown in block 101 are calculated. Finally, since $D_0$ will be used as $D_6$ during the next symbol interval, $D_0$ is saved in the storage location for $D_6$. The simplicity and speed of this routine for generating a clock error signal is apparent from FIG. 5 and the foregoing description.

The flow chart of FIG. 5 just described illustrates a particular implementation of FIG. 2 in a microprocessor environment. A significant advantage of the invention is that calculations need only be made at the symbol rate, thus conserving valuable microprocessor time.

Those skilled in the art will readily appreciate that the subject invention has numerous applications other than in the preferred embodiment just described. Therefore, it is to be understood that, within the scope of the appended claims, the invention may be practiced other than as specifically described herein.

What is claimed is:

1. In a data modem receiver having means for converting an analog signal into a digital input signal, having a symbol rate, clock extraction apparatus comprising:
    a first filter means providing a periodic amplitude response and supplied with the digital input signal and providing successive outputs;
    a squaring circuit means for squaring each output of said filter means to provide a squared output signal containing a spectral component at the symbol rate.

2. The apparatus of claim 1 further including a phase-locked timing generator and a second filter means for filtering the squared output of said squaring circuit means to provide a clock error signal at symbol rate, such that the phase-locked timing generator is corrected at symbol rate.

3. In a data receiving apparatus including a sampling means for converting an analog received signal to a succession of digital samples at a selected sample rate higher than the symbol rate of said receiving apparatus, a method of clock extraction comprising the steps of:
    storing a plurality of said digital samples;
    calculating a plurality of quantities as the difference of respective said samples spaced a selected time interval apart;
    squaring each of said quantities to produce a plurality of squared quantities;
    forming a clock error signal as a sum and difference of selected squared quantities; and
    utilizing said clock error signal to generate a corrected clock signal.

4. The method of claim 3 wherein said step of calculating calculates said quantities according to the expression $W_n - W_{n-24}$ where $W_{n-24}$ is a sample delayed by 24 samples from sample $W_n$.

5. The method of claim 3 or 4 wherein the clock error is formed according to the expression $D_0^2 - D_1^2 - D_2^2 + D_4^2 + D_5^2 - D_6^2$ where $D_n^2, n = 0 \ldots 6$ represents the said squared quantities with $D_0^2$ being the most recently received said squared quantity and $D_6^2$ being the latest.

6. In a data receiver having sampling means for sampling an analog form of a received signal to produce a plurality of received signal samples at a sample rate, said sample rate being higher than the symbol rate of the data receiver, apparatus for use in correcting clock errors comprising:

a double restrictive bandpass filter means having its filter characteristic located such that a peak thereof coincides with the frequency components of the received signal located at $F_c \pm F_o$ where $F_c$ is the carrier frequency and $F_o$ is one-half the symbol rate, said filter means being supplied with said samples at the sample rate and outputting a plurality of filtered quantities;

means performing a nonlinear operation on the filtered quantities outputted by said filter means to provide an output signal containing a spectral component at the symbol rate.

7. The apparatus of claim 6 further including a sampling filter means supplied with said output signal for filtering said output signal to provide a clock error correction signal.

8. The apparatus of claim 7 wherein said sampling filter means comprises a plurality of delay elements, selected outputs of which are multiplied by plus or minus "1" and summed to form said clock error correction signal.

9. The apparatus of claims 6 or 7 wherein said double restrictive bandpass filter means comprises a periodic filter.

10. The apparatus of claims 6 or 7 wherein said double restrictive bandpass filter means comprises a digital filter.

11. In a data receiving apparatus including a sampling means supplied with an analog received signal and operative to convert said analog received signal to digital output samples at a selected sample rate higher than the symbol rate of said receiving apparatus, a method of clock extraction comprising the steps of:

storing a plurality of samples of the output of the sampling means;

calculating a plurality of first quantities as the difference of respective said samples spaced a selected time itnerval apart;

performing a nonlinear operation on each of said first quantities to produce a plurality of second quantities containing a spectral component at the symbol rate;

forming a clock error signal from selected said second quantities; and utilizing said clock error signal to generate a corrected clock signal.

12. The method of claim 11 wherein said step of calculating calculates said symbols according to the expression $W_n - W_{n-24}$ where $W_{n-24}$ is a sample delayed 24 samples from sample $W_n$.

13. The method of claim 11 or 12 wherein the clock error is calculated as a sum and difference of said second quantities.

* * * * *

UNITED STATES PATENT AND TRADEMARK OFFICE
CERTIFICATE OF CORRECTION

PATENT NO. : 4,455,665
DATED : June 19, 1984
INVENTOR(S) : Philip Frederick Kromer, III It is certified that error appears in the above—identified patent and that said Letters Patent is hereby corrected as shown below:

Column 1, delete lines 21 - 53 under the heading "Summary of The Invention" and substitute the followingsummary therefor:

--It is therefore an object of the invention to provide an improved timing recovery scheme for a data modem.

It is a more particular object of the invention to provide a clock extraction circuit providing a timing error signal in such a timing recovery circuit.

It is yet another object of the invention to provide a clock extraction circuit adapted to a digital implementation which provides accurate timing with a reduced number of microprocesor operations.

UNITED STATES PATENT AND TRADEMARK OFFICE
CERTIFICATE OF CORRECTION

PATENT NO. : 4,455,655

DATED : June 19, 1984

INVENTOR(S) : Philip Frederick Kromer, III

It is certified that error appears in the above—identified patent and that said Letters Patent is hereby corrected as shown below:

These and other objects are accomplished according to the invention by provision of a clock extraction circuit employing a filter at the input of a data modem receiver which has a periodic characteristic in the frequency domain. The periodic filter samples at the sample rate and produces successive outputs. The successive outputs are then operated on to produce an output signal containing a spectral component at the symbol rate. This output signal may then be supplied to a sampling filter whose output provides an error signal suitable for adjustment of phase locked timing generator.

UNITED STATES PATENT AND TRADEMARK OFFICE
CERTIFICATE OF CORRECTION

PATENT NO. : 4,455,665

DATED : June 19, 1984

INVENTOR(S) : Philip Frederick Kromer, III

It is certified that error appears in the above—identified patent and that said Letters Patent is hereby corrected as shown below:

An aspect of the invention believed novel is the provision of a filter, preferably a periodic filter, providing a double restrictive bandpass characteristic with peaks at $F_c \pm F_o$ where $F_c$ is the carrier frequency and $F_o$ is one-half the symbol rate.-- therefor.

Column 1, line 1, delete the word "symbol"

Column 3, line 11, after "2200" delete "$\geq$" and substitute -->-- therefor.

Column 3, line 13, after "3000" delete "$\geq$" and substitute -->-- therefor.

Column 6, line 19, after "time" delete "itnerval" and substitute --interval-- therefor.

Signed and Sealed this

Twenty-sixth Day of February 1985

[SEAL]

Attest:

DONALD J. QUIGG

Attesting Officer    Acting Commissioner of Patents and Trademarks